(12) United States Patent
Kim et al.

(10) Patent No.: US 12,524,669 B2
(45) Date of Patent: Jan. 13, 2026

(54) METHOD AND DEVICE FOR CALCULATING THERMAL CHARACTERISTICS OF BUILDING STRUCTURE USING ARTIFICIAL NEURAL NETWORK

(71) Applicant: IUCF-HYU (INDUSTRY-UNIVERSITY COOPERATION FOUNDATION HANYANG UNIVERSITY), Seoul (KR)

(72) Inventors: Hak-Sung Kim, Seoul (KR); Dug-Joong Kim, Seoul (KR); Sang-Il Kim, Seoul (KR); Se-Min Lee, Seoul (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 639 days.

(21) Appl. No.: 18/046,673

(22) Filed: Oct. 14, 2022

(65) Prior Publication Data

US 2023/0289593 A1  Sep. 14, 2023

(30) Foreign Application Priority Data

Mar. 8, 2022 (KR) .................. 10-2022-0029310

(51) Int. Cl.
*G06N 3/08* (2023.01)
(52) U.S. Cl.
CPC ..................... *G06N 3/08* (2013.01)

(58) Field of Classification Search
CPC ........ G06N 3/08; G06N 3/0464; G06N 3/048; G06N 3/084; G06N 3/09; G06N 3/045; G06N 3/0455; G01N 25/18; G01J 5/025; G01J 5/48; G01J 2005/0077
See application file for complete search history.

(56) References Cited

U.S. PATENT DOCUMENTS

2019/0310589 A1* 10/2019 Gervais ................ G05B 13/027

FOREIGN PATENT DOCUMENTS

KR        10-1714400 B1     3/2017

\* cited by examiner

*Primary Examiner* — Pei Yong Weng

(57) ABSTRACT

A device for calculating thermal characteristics of a building structure using an artificial neural network comprise a first artificial neural network which receives first input information including a drawing image as input information and outputs first output information including feature information, in which shape information for each part of the drawing image is extracted, as output information, a second artificial network which receives the first output information and second input information including thermal conductivity information for each part as input information and outputs second output information including temperature distribution image information corresponding to the drawing image as output information and a third artificial neural network which receives the first output information and the second input information as input information and outputs third output information including heat flow distribution image information corresponding to the drawing image as output information.

13 Claims, 11 Drawing Sheets

FIG. 8

| TYPE OF REFERENCE DATA | ITEM | FIRST CASE | SECOND CASE | THIRD CASE |
|---|---|---|---|---|
| SECOND REFERENCE DATA | HEAT FLUID DISTRIBUTION | | | |
| THIRD REFERENCE DATA | TEMPERATURE DISTRIBUTION | | | |
| FOURTH REFERENCE DATA | HEAT LOSS [W/m] | 51 | 53 | 41 |
| FIFTH REFERENCE DATA | LINEAR THERMAL TRANSMITTANCE [W/m] | 1.14 | 0.78 | 0.74 |

METHOD AND DEVICE FOR CALCULATING THERMAL CHARACTERISTICS OF BUILDING STRUCTURE USING ARTIFICIAL NEURAL NETWORK

CROSS-REFERENCE TO RELATED APPLICATION

This application claims priority under 35 U.S.C. 119(a) to Korean Patent Application No. 10-2022-0029310, filed on Mar. 8, 2022, the disclosure of which is incorporated herein by reference in its entirety.

BACKGROUND

1. Field of the Invention

The present disclosure relates to a method and a device for calculating thermal characteristics of a building structure using an artificial neural network, and more particularly, to a technology for performing inference and training an artificial neural network for calculating various thermal characteristics of a building structure based on data generated through a finite element method.

2. Discussion of Related Art

In a building, an indoor space is a space for maintaining the comfort of occupants from indoor and outdoor environmental changes in terms of construction environment facilities. The comfort of occupants may be changed in real time due to a combination of various thermal factors. Among the thermal factors, the most representative thermal factor is temperature. Therefore, there is a need to evaluate a temperature distribution to create a comfortable indoor environment for occupants. Recently, due to environmental issues such as global warming, technologies for efficiently managing and reducing thermal energy in industrial and residential buildings are attracting attention.

To this end, an accurate and fast thermal energy analysis method is required when a building is designed, and a measurement method and an analysis method in consideration of the characteristics of a heat bridge are generally used.

Specifically, a thermal bridge is a region in which heat transfer occurs in a building envelope when there is a temperature difference between an indoor area and an outdoor area. The thermal bridge may be generated in a direction from a region with a relatively high heat flow toward a region with a relatively low heat flow. Such a thermal bridge may cause the degradation of the thermal insulation performance in the entirety of a building, an increase in energy loss, and a problem of thermal comfort and may cause dew condensation. The thermal bridge may be classified into a material thermal bridge, a geometric thermal bridge, and a structural thermal bridge according to the cause of generation and may be classified into a linear thermal bridge and a point thermal bridge according to a type of generation.

Conventionally, as a method of measuring a thermal bridge, a thermal bridge has been derived through a simple mathematical calculation method using a result value using a thermal imaging camera. However, there are disadvantages in that the method is difficult to apply and is inaccurate when a building is designed. Therefore, a method proposed to overcome such disadvantages is a finite element method (FEM).

A FEM is a method of modeling a building on a computer and deriving a heat loss value, linear thermal transmittance, temperature distribution, and a heat flow distribution of a building through heat transfer equation-based analysis. Specifically, the FEM is performed through three operations of pre-processing, solving, and post-processing. The pre-processing is an operation of defining drawings and setting a thermal boundary condition, a temperature condition, a constraint condition of each region, and the calculation is an operation of calculating a model modeled in the pre-processing through a heat transfer equation, and the post-processing is an operation of summarizing calculation results and deriving results that is, deriving a heat loss value and temperature and heat flow distribution images in a desired format.

In a FEM, a result can be derived from a thermal characteristic value of a building without actual measurement and complicated processes. However, in order to apply the FEM, it is necessary to check results for a plurality of structures and design a building based on the checked results, and thus, there is a disadvantage that a considerable amount of time and labor cost are required for repetitive pre-processing, calculating, and post-processing processes according to models.

SUMMARY

Accordingly, a method and a device for calculating thermal characteristics of a building structure according to one embodiment is an invention devised to solve the above-described problems, and the present disclosure is directed to provide a device in which, after a finite element method is automated, an artificial neural network for calculating thermal characteristic information of a building structure is trained using information acquired through the automation as basic data, thereby calculating the thermal characteristic information of the building structure more accurately and more quickly compared with a related art.

In addition, the present disclosure is directed to provide a method and a device capable of, by implementing a deep learning algorithm trained in such a manner in the form of software, analyzing thermal characteristics of a building structure in real time in which without the need for modeling and analysis times according to a separate finite element analysis in order to analyze thermal characteristics of a building structure unlike a related art.

According to an aspect, a device for calculating thermal characteristics of a building structure using an artificial neural network, the device may comprise a first artificial neural network which receives first input information including a drawing image as input information and outputs first output information including feature information, in which shape information for each part of the drawing image is extracted, as output information, a second artificial network which receives the first output information and second input information including thermal conductivity information for each part as input information and outputs second output information including temperature distribution image information corresponding to the drawing image as output information and a third artificial neural network which receives the first output information and the second input information as input information and outputs third output information including heat flow distribution image information corresponding to the drawing image as output information.

The device further may comprise a reference data generator which generates second reference data corresponding to the second output information for training the second artificial neural network and third reference data corresponding to the third output information for training the third artificial neural network, the second artificial neural network and the third artificial neural network learn based on the second reference data and the third reference data, respectively.

The reference data generator may generate the second reference data and the third reference data using a finite element method (FEM).

The reference data generator may generate drawing images respectively corresponding to the second output information and the third output information as the second reference data and the third reference data through the FEM, based on the feature information for each part of the drawing image The feature information for each part may include information acquired by parameterizing features of a shape and a thermal property of the part.

The device may comprise a connection layer configured to integrate the first output information and the second input information into one layer.

The connection layer may be disposed between an output layer of the first artificial neural network and an input layer of the second artificial neural network and the third artificial neural network.

According to another aspect, a device for calculating thermal characteristics of a building structure using an artificial neural network, the device may comprise a fourth artificial network which receives second information including thermal conductivity information about parts included in a drawing image and third input information including shape information about the parts as input information and outputs fourth output information including total heat loss information about the parts included in the drawing image as output information and a fifth artificial neural network which receives second input information and third input information as input information and outputs fifth output information including total linear thermal transmittance information about the parts included in the drawing image as output information.

The device may further comprise a reference data generator which generates fourth reference data corresponding to the fourth output information for training the fourth artificial neural network and fifth reference data corresponding to the fifth output information for training the fifth artificial neural network, the fourth artificial neural network and the fifth artificial neural network learn based on the fourth reference data and the fifth reference data, respectively.

The reference data generator may generate the fourth reference data and the fifth reference data using a finite element method (FEM).

The reference data generator may generate data values respectively corresponding to the fourth output information and the fifth output information as the fourth reference data and the fifth reference data through the FEM, based on feature information for each part of the drawing image The feature information for each part may include information acquired by parameterizing features of a shape and a thermal property of the part.

According to other aspect, a method of calculating thermal characteristics of a building structure using an artificial neural network, the method may comprise a first output information outputting operation of outputting first output information using a first artificial neural network which receives first input information including a drawing image as input information and outputs the first output information including feature information, in which shape information for each part of the drawing image is extracted, as output information, a second output information outputting operation of outputting second output information using a second artificial network which receives the first output information and second input information including thermal conductivity information corresponding to the drawing image as input information and outputs the second output information including temperature distribution image information corresponding to the drawing image as output information; and a third output information outputting operation of outputting third output information using a third artificial neural network which receives the first output information and the second input information including the thermal conductivity information corresponding to the drawing image as input information and outputs the third output information including heat flow distribution image information corresponding to the drawing image as output information.

The method may further comprise a reference data generating operation of generating second reference data corresponding to the second output information for training the second artificial neural network and third reference data corresponding to the third output information for training the third artificial neural network and a learning operation of training the second artificial neural network and the third artificial neural network based on the second reference data and the third reference data, respectively.

The reference data generating operation may include based on the feature information for each part of the drawing image, generating drawing images respectively corresponding to the second output information and the third output information as the second reference data and the third reference data through a finite element method.

BRIEF DESCRIPTION OF THE DRAWINGS

FIG. 8 is a diagram illustrating reference data output by the reference data generator according to one embodiment of the present disclosure.

DETAILED DESCRIPTION OF EXEMPLARY EMBODIMENTS

Figure 1A:
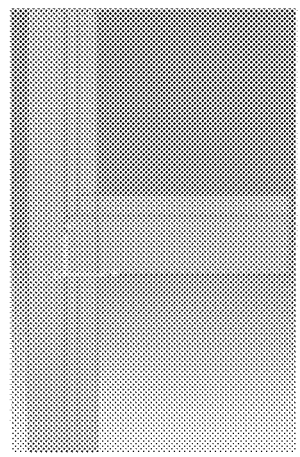
FIGS. 1A to 1D show diagrams illustrating a method of deriving various parameters related to a building structure through a finite element method according to a related art.
Figure 1B:
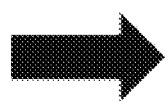
Figure 1B:
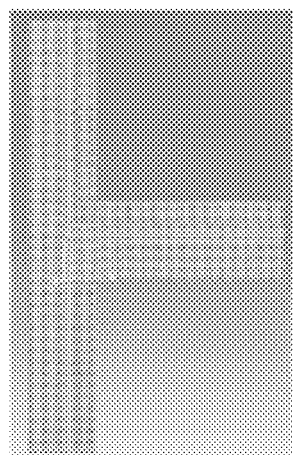

Hereinafter, embodiments according to the present disclosure will be described with reference to the accompanying drawings. In adding reference numerals to constituent elements of each drawing, it should be noted that the same constituent elements are denoted by the same reference numeral even if they are illustrated on different drawings. In describing the embodiments of the present disclosure, a detailed description of pertinent known constructions or functions will be omitted if it is deemed to make the gist of the embodiments the present disclosure unnecessarily vague. In addition, the embodiments of the present disclosure will be described below, but the technical idea of the present disclosure is not limited thereto or is not restricted thereto, and may be variously realized by being modified by those skilled in the art.

In addition, terms used in the present specification are used only in order to describe embodiments rather than limiting or restricting the present disclosure. Singular forms are intended to include plural forms unless the context clearly indicates otherwise.

In the present specification, it should be understood that the term "include", "comprise", or "have" indicates that a feature, a number, a step, an operation, a constituent element, a part, or a combination thereof described in the specification is present, but does not exclude a possibility of presence or addition of one or more other features, numbers, steps, operations, constituent elements, parts, or combinations, in advance.

In addition, throughout the specification, when it is described that an element is "connected" to another element, this includes not only being "directly connected", but also being "indirectly connected" with another element in between, and terms including ordinal numbers such as first, second, and the like used in the present specification will be used only to describe various elements, and are not to be interpreted as limiting these elements.

The present disclosure will be described more fully hereinafter with reference to the accompanying drawings, in which embodiments of the invention are shown. In the drawings, parts irrelevant to the description are omitted in order to clearly describe the present disclosure.

Furthermore, the title of the invention is a method and apparatus for providing a document editing interface for providing resource information related to a document using a backlink button. For convenience of explanation, however, in the specification below, an apparatus for providing a document editing interface for providing resource information associated with a document using a backlink button is referred to as a document editing interface providing apparatus in its description. The meaning of 'clicking' throughout the document is used to refer to the user requesting an execution command for the button, and as a common term, it may refer to executing a command by clicking a mouse or using a specific key on a keyboard in a PC environment, and tapping by a user's touch consecutively or for a certain period of time in a mobile environment.

Hereinafter, embodiments in accordance with the present disclosure will be described in detail with reference to the accompanying drawings, and although the title of the present disclosure is 'a device for calculating thermal characteristics of building structure using artificial neural network', it will be referred to as 'a device for calculating thermal characteristics of building structuret' for the convenience of the description below.

FIGS. 1A to 1D show diagrams illustrating a method of deriving various parameters related to a building structure through a finite element method according to a related art.

Referring to FIGS. 1A to 1D, in a method of predicting thermal characteristics of a building structure through a finite element method according to the related art, after modeling, meshing, and boundary condition setting processes are performed on a finite element analysis program, a model is calculated to derive desired thermal characteristic values.

Figure 1D:
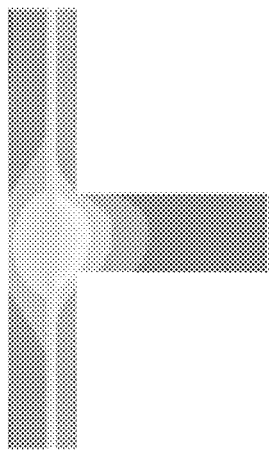
Figure 1C:
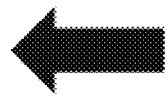
Figure 1C:
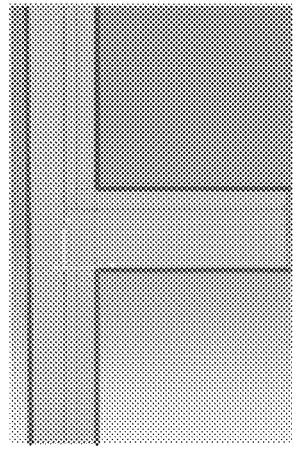

Specifically, as shown in FIGS. 1A to 1D, a finite element method includes defining a drawing through a modeling operation using a drawing program (see FIG. 1A), performing a meshing operation after a drawing operation (see FIG. 1B), setting a thermal boundary condition, a temperature condition, a constraint condition, and the like (see FIG. 1C). When data about a modeled model is calculated through a heat transfer equation by performing such operations, as shown in FIG. 1D, information about an image including thermal temperature information may be output.

On the other hand, in the finite element method, a result can be derived from a thermal characteristic value of a building without actual measurement and complicated processes. However, it is necessary to check results for a plurality of structures and design a building based on the checked results, and thus, there is a disadvantage that a considerable amount of time and labor cost are required for repetitive pre-processing, calculating, and post-processing processes according to models.

Accordingly, a method and a device for calculating thermal characteristics of a building structure according to one embodiment is an invention devised to solve the above-described problems, and the present disclosure is directed to provide a device in which, after a finite element method is automated, an artificial neural network for calculating thermal characteristic information of a building structure is trained using information acquired through the automation as basic data, thereby calculating the thermal characteristic information of the building structure more accurately and more quickly compared with the related art. Hereinafter, the structure and process of the present disclosure will be described in detail with reference to the drawings.

Figure 2:
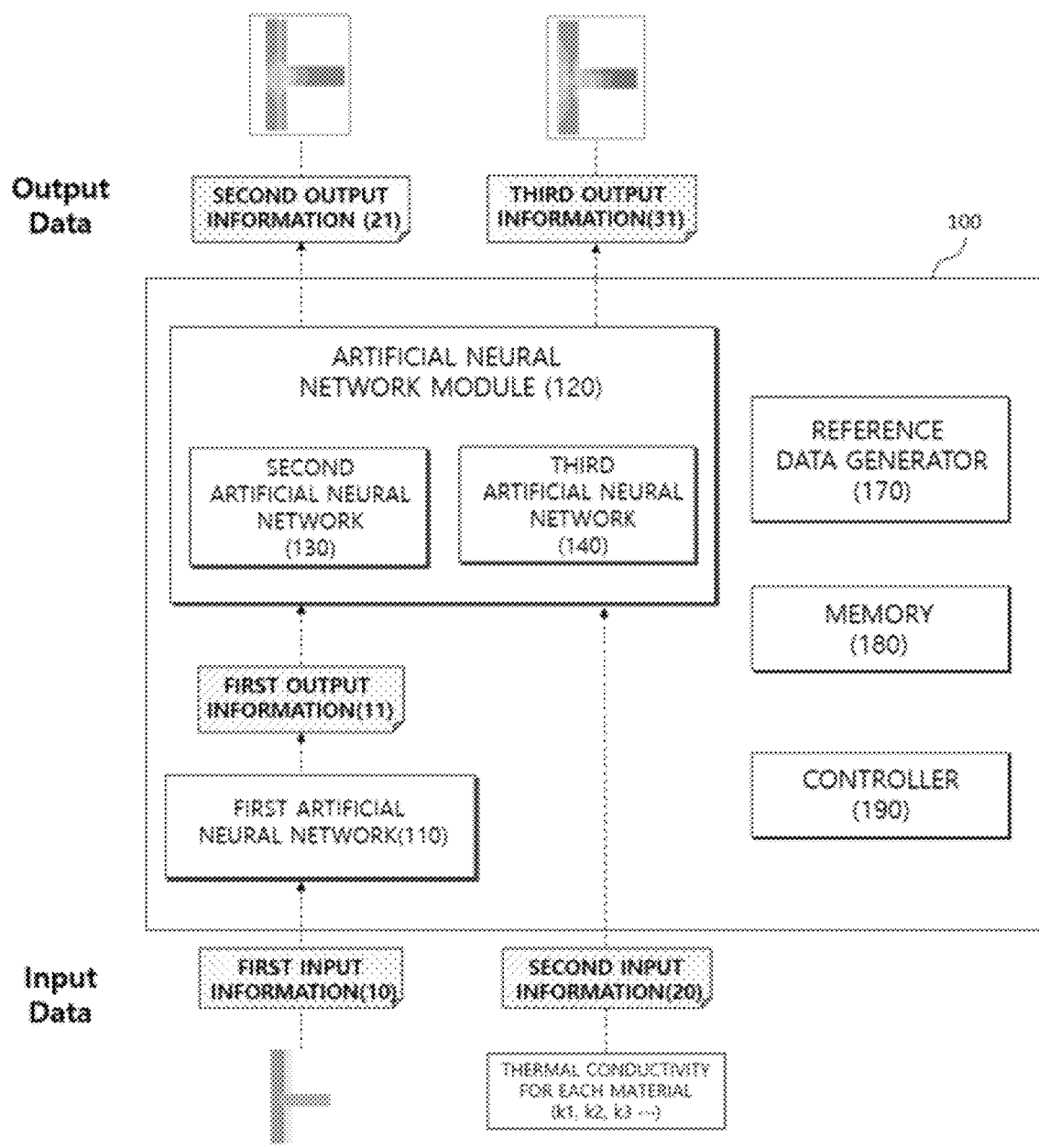
FIG. 2 is a diagram illustrating some components of a device for calculating thermal characteristics of a building structure according to one embodiment of the present disclosure.
Figure 3:
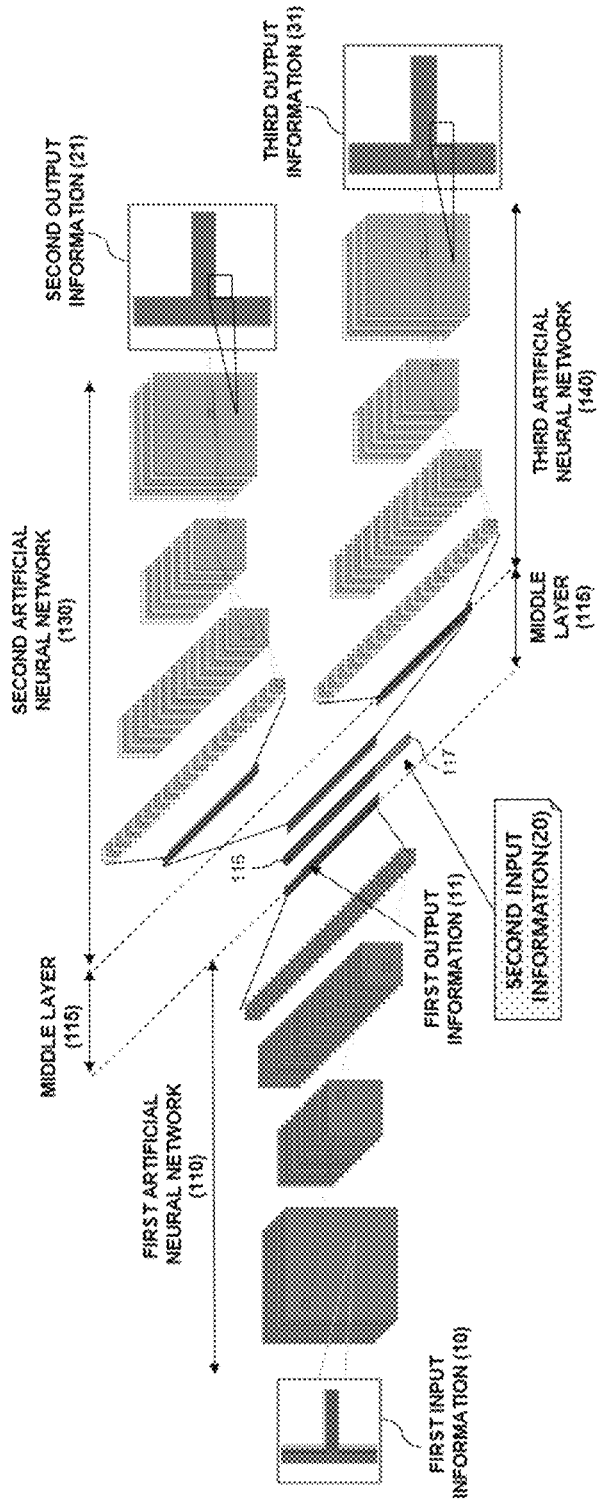
FIG. 3 is a diagram illustrating specific layers of each artificial neural network constituting the device for calculating thermal characteristics of a building structure according to one embodiment of the present disclosure.
Figure 4:
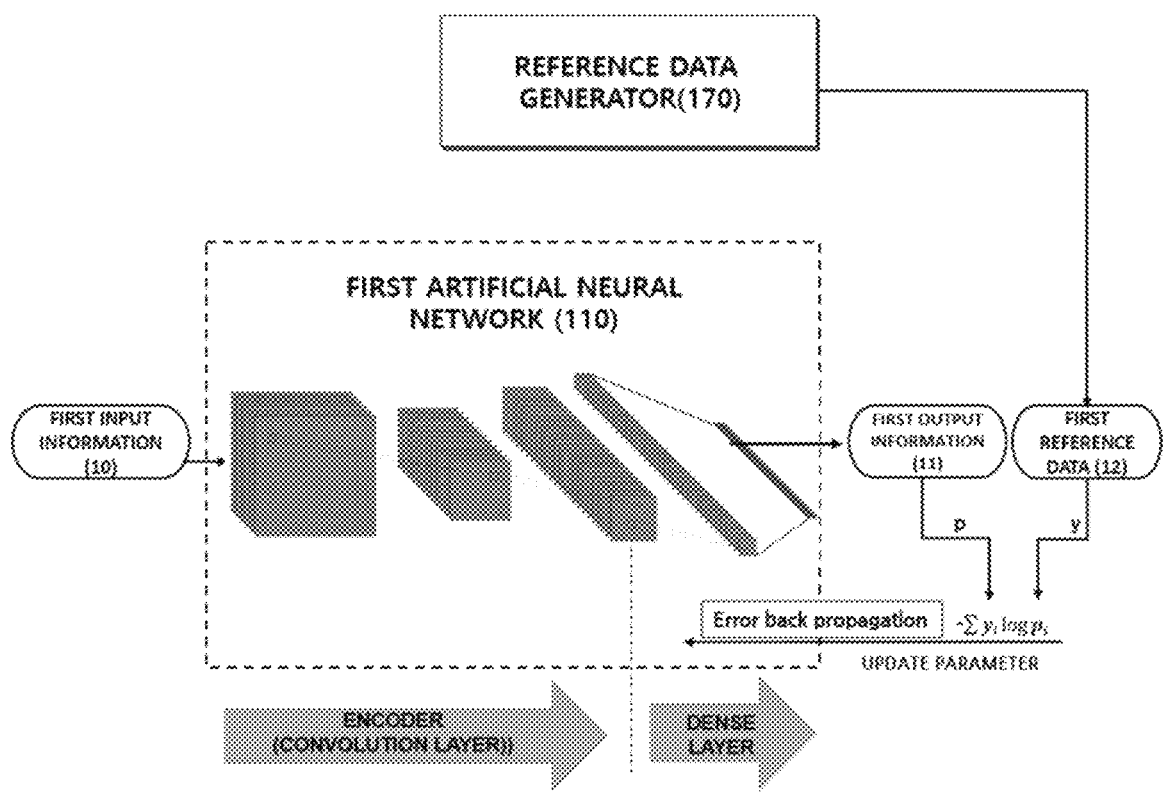
FIG. 4 is a diagram illustrating input information and output information of a first artificial neural network according to one embodiment of the present disclosure.
Figure 5:
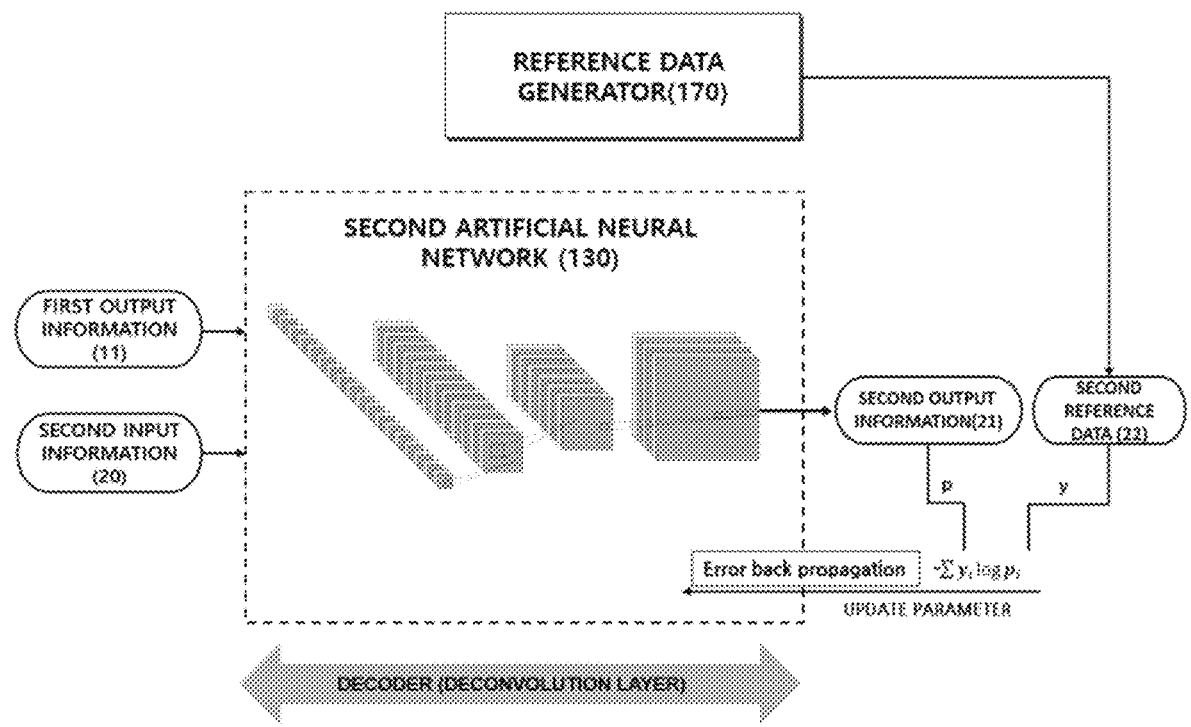
FIG. 5 is a diagram illustrating input information and output information of a second artificial neural network according to one embodiment of the present disclosure.
Figure 6:
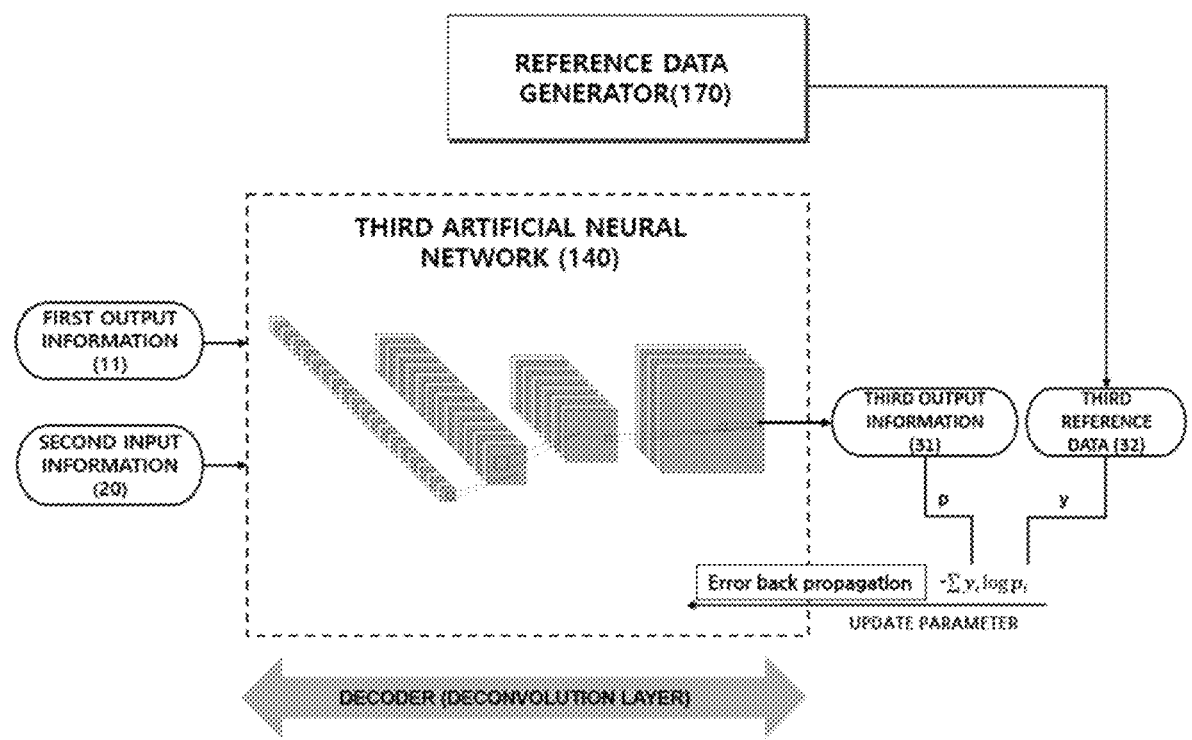
FIG. 6 is a diagram illustrating input information and output information of a third artificial neural network according to one embodiment of the present disclosure.

FIG. 2 is a diagram illustrating some components of a device for calculating thermal characteristics of a building structure according to one embodiment of the present disclosure. FIG. 3 is a diagram illustrating specific layers of each artificial neural network constituting the device for calculating thermal characteristics of a building structure according to one embodiment of the present disclosure. FIG. 4 is a diagram illustrating input information and output information of a first artificial neural network according to one embodiment of the present disclosure. FIG. 5 is a diagram illustrating input information and output information of a second artificial neural network according to one embodiment of the present disclosure. FIG. 6 is a diagram illustrating input information and output information of a third artificial neural network according to one embodiment of the present disclosure.

Referring to FIG. 2, a device 100 for calculating thermal characteristics of a building structure using an artificial neural network according to one embodiment of the present disclosure may include a first artificial neural network 110, an artificial neural network module 120, a reference data generator 170, a memory 180, a controller 190, and the like. The artificial neural network module 120 may include a second artificial neural network 130 and a third artificial neural network 140.

As shown in FIG. 3, the first artificial neural network 110 is a pre-trained artificial neural network receiving first input information 10 as input information and outputting first output information 11 as output information. Although not shown in the drawing, the first artificial neural network 110 may include a learning session for performing learning based on the first input information 10, the first output information 11, and first reference data 12, and an inferring session for inferring the first output information 11 based on the first input information 10.

The first input information 10 refers to drawing image information about at least a portion of a building structure to be analyzed. That is, as shown at the lower side of FIG. 2, the first input information 10 may indicate a drawing image of a specific area in the building structure.

The first output information 11 refers to feature information acquired by analyzing the drawing image according to the first input information 10 for each part and extracting shape information about each part.

The first reference data 13 refers to ground truth information which is generated by the reference data generator 170 and is used to train the first artificial neural network 110.

The first reference data 13 generated by the reference data generator 170 may include general reference data used to train an artificial neural network. In one embodiment, the first reference data 13 may also refer to reference data including feature information corresponding to the drawing image included in the first input information 10 generated through a finite element method.

The first artificial neural network 110 is an artificial neural network serving as an encoder. The first artificial neural network 110 extracts feature information, which includes shape information for each part, from the drawing image included in the first input information using an encoder including a convolution layer set and outputs the extracted feature information as the first output information 11.

Specifically, the first artificial neural network 110 includes the convolution layer set. The convolution layer set may include a convolution layer for extracting shape information of an input drawing image, a normalization layer for normalizing the distribution of data, and an activation function for determining whether to output received data to a subsequent neural network, and the like. Therefore, as an example, the first artificial neural network 110 includes layers or the like which perform batch normalization, rectified linear unit (ReLU) activation, and max-pooling. Each convolution layer set may include 64 to 128 filters.

The artificial neural network module 120 is a pre-trained artificial neural network receiving the first output information 11 and second input information 20 as input information and outputting second output information 21 and third output information 31 as output information. As shown in FIGS. 2 and 3, the artificial neural network module 120 may include the second artificial neural network 130 receiving the first output information 11 and the second input information 20 as input information and outputting the second output information 21 as output information and the third artificial neural network 140 receiving the first output information 11 and the second input information 20 as input information and outputting the third output information 31 as output information.

Meanwhile, in FIGS. 2 and 3, for convenience of description, it has been described that each of the second artificial neural network 130 and the third artificial neural network 140 is an independent component, but embodiments of the present disclosure are not limited thereto. The artificial neural network module 120 may include one artificial neural network which outputs two pieces of output information (the second output information 21 and the third output information 31).

Since the second artificial neural network 130 and the third artificial neural network 140 receives the second input information 20, which is information input as separate information from output information of the first artificial neural network 110, as input information, as shown in FIG. 3, the second artificial neural network 130 and the third artificial neural network 140 may include a plurality of dense layers and thus include a middle layer 115 for coupling and connecting the first output information 11 and the second input information 20.

Specifically, the middle layer 115 may include a first fully-connected layer (FC) 116 and a second fully-connected layer (FC) 117. The first FC layer 116 may include a dense layer for combining the first output information 11 and the second input information 20, and the second FC layer 117 may serve to separate layers in two directions in order to transmit combined information to each of the second artificial neural network 130 and the third artificial neural network 140.

Accordingly, the first output information 11 passing through a convolution layer is converted into a one-dimensional tensor and then combined with the second input information, which is another piece of input information, through the plurality of dense layers. Then, such combined data is reconstructed into a three-dimensional tensor while passing through the dense layers again, and the reconstructed data is used as input data of the second artificial neural network 130 and the third artificial neural network 140.

Meanwhile, in FIG. 3, one middle layer is shown as a separate component that is separate from the second artificial neural network 130 and the third artificial neural network 140, but embodiments of the present disclosure are not limited thereto. The second artificial neural network 130 and the third artificial neural network 140 may each include a middle layer at a front end of the artificial neural network, and thus the first output information 11 and the second input information 20 may be combined in each artificial neural network.

As shown in FIG. 3, the second artificial neural network 130 is a pre-trained artificial neural network receiving the first input information 11 and the second input information 20 as input information and outputting the second output information 21 as output information. Although not shown in the drawing, the second artificial neural network 130 may include a learning session for performing learning based on the first input information 11, the second input information 20, the second output information 21, and second reference data 22, and an inferring session for inferring the second output information 21 based on the first output information 11 and the second input information 20. Since the first output information 11 input to the second artificial neural network 130 has been described above in detail, descriptions thereof will be omitted, and the second input information 20, which is another piece of input information, will be described.

Specifically, the second input information 20 refers to each of pieces of thermal conductivity information k1, k2, k3 . . . for each part corresponding to the drawing image included in the first input information 10. Specifically, as shown in FIG. 2, since the drawing image is divided into parts, the second input information refers to thermal conductivity information about each of the divided parts.

The second output information 21 output by the second artificial neural network 130 refers to information about a temperature distribution image corresponding to the drawing image included in the first input information 10. Image information may include color information as shown in FIG. 3, and a user can intuitively know a temperature distribution image of an object to be analyzed through the color information.

The second reference data 22 for training the second artificial neural network 130 refers to ground truth information generated by the reference data generator 170.

The second reference data 22 generated by the reference data generator 170 refers to reference data generated by performing a finite element method on temperature image information corresponding to the drawing image included in the first input information 11. A method of generating reference data will be described in detail with reference to FIGS. 7 and 8, which will be described below.

As shown in FIG. 3, the third artificial neural network 140 is a pre-trained artificial neural network receiving the first input information 11 and the second input information 20 as input information and outputting the third output information 31 as output information. Although not shown in the drawing, the third artificial neural network 140 may include a learning session for performing learning based on the first input information 11, the second input information 20, the third output information 31, and third reference data 32, and an inferring session for inferring the third output information 31 based on the first output information 11 and the second input information 20.

Meanwhile, since the first output information 11 and the second input information 20 input to the second artificial neural network 130 have been described in detail above, the third output information 31 will be described in detail.

Specifically, the third output information 31 output by the third artificial neural network 140 refers to information about a heat flow image corresponding to the drawing image included in the first input information 10. Image information may include color information as shown in FIG. 3, and a user can intuitively know a temperature distribution image of an object to be analyzed through the color information.

The third reference data 32 for training the third artificial neural network 140 refers to ground truth information generated by the reference data generator 170.

The third reference data 32 generated by the reference data generator 170 may refer to reference data generated by performing a finite element method on temperature image information corresponding to the drawing image included in the first input information 11. A method of generating the third reference data 32 will be described in detail with reference to FIGS. 7 and 8.

The second artificial neural network 130 and the third artificial neural network 140 are artificial neural networks which serve as decoders. Each of the second artificial neural network 130 and the third artificial neural network 140 may generate a temperature distribution image corresponding to the second output information 21 and a heat flow distribution image corresponding to the third output information 31 using a decoder including a deconvolution layer set.

Specifically, the second artificial neural network 130 and the third artificial neural network 140 may each include a deconvolution layer set, and the deconvolution layer set may include an upsampling layer for expanding features extracted for image generation, a deconvolution layer for generating an image based on input information, and the like.

Therefore, as an example, the second artificial neural network 130 and the third artificial neural network 140 include layers which perform batch normalization, ReLU activation, and max-pooling, and each convolution layer set may include 64 to 128 filters.

Figure 7:
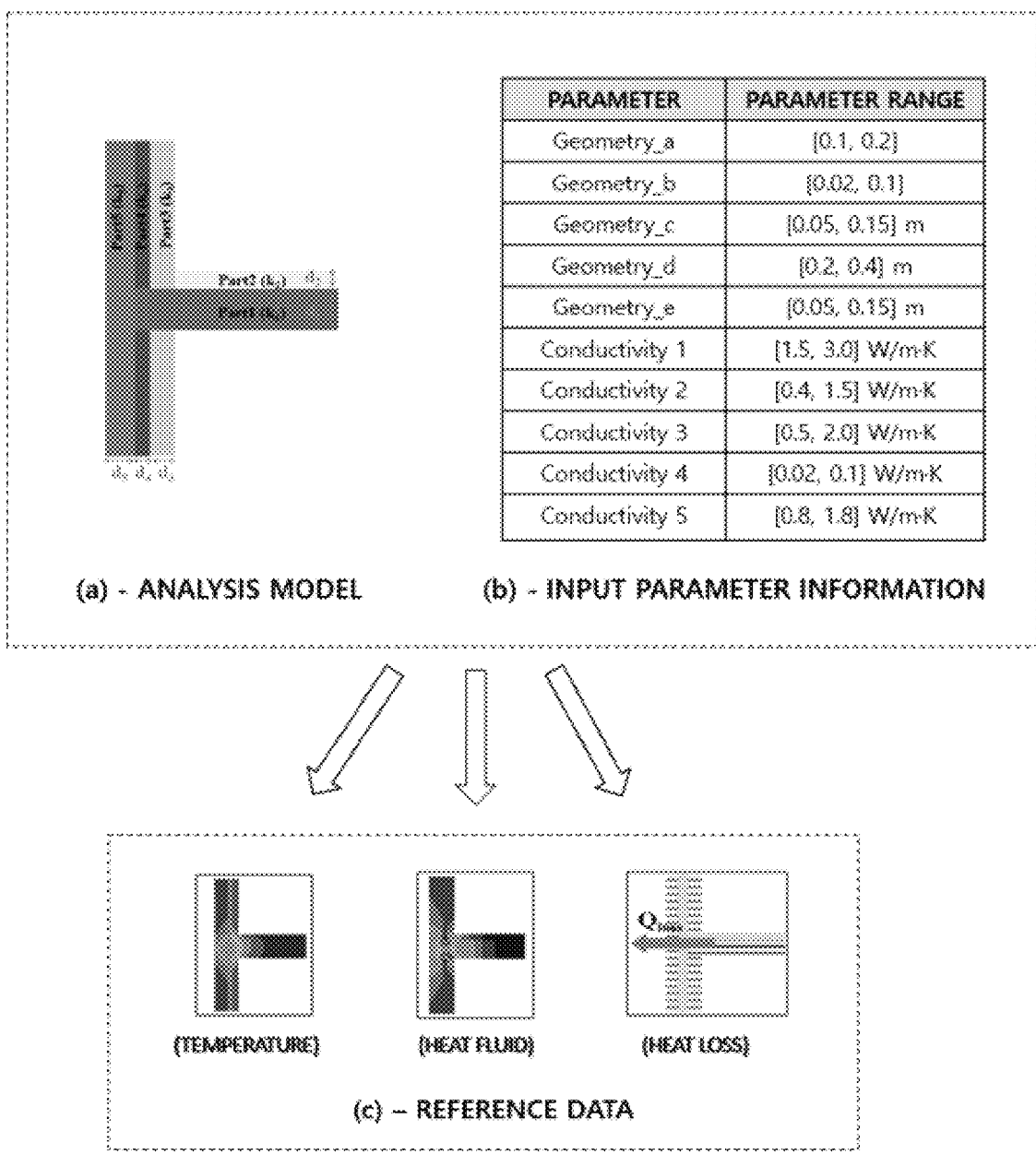
FIG. 7 shows diagrams for describing a method in which the reference data generator generates reference data according to one embodiment of the present disclosure.

FIG. 7 shows diagrams for describing a method in which the reference data generator generates reference data according to one embodiment of the present disclosure. FIG. 8 is a diagram illustrating reference data output by the reference data generator according to one embodiment of the present disclosure.

Referring to FIG. 7, the reference data generator 170 according to one embodiment is a component which generates reference data necessary for training at least one artificial neural network of the second artificial neural network 130 and the third artificial neural network 140. The reference data generator 170 may generate reference data through the above-described finite element method.

The reference data generator 170 may generate reference data based on information acquired by parameterizing features of a shape and a thermal property of each part of the drawing image included in the first input information 10. Specifically, as shown in FIG. 7, the reference data generator 170 may generate reference data through an operation of parameterizing a shape and a thermal property of a part, an operation of generating an analysis model by linking data about the shape and the thermal property of the part to a finite element analysis design automation script, and an operation of automating a finite element analysis.

Meanwhile, the operation of the parameterizing may include parameterizing the shape and the thermal property of the part and storing parameterized information of the part in a data base using a random number generating function. The operation of generating the model may include a process of performing pre-processing, such as setting of a boundary condition, a mesh size, and a physical property for generating a finite element analysis model, using the script.

As shown in FIG. 8, the reference data generated by the reference data generator 170 may include heat flow distribution image information, temperature distribution image information, heat loss information, and linear transmittance information.

Specifically, the heat flow distribution image information may become the second reference data 22 required for the second artificial neural network 130 to learn. The temperature distribution image information may become the third reference data 32 required for the third artificial neural network 140 to learn. The heat loss information may become fourth reference data 42 necessary for a fourth artificial neural network 150, which will be described below, to learn. The linear transmittance information may become fifth reference data 52 required for a fifth artificial neural network 160, which will be described below, to learn. Meanwhile, although not shown in the drawing, the first reference data 12, which is required for the first artificial neural network 110 to learn, may also be generated by the reference data generator 170.

Figure 9:
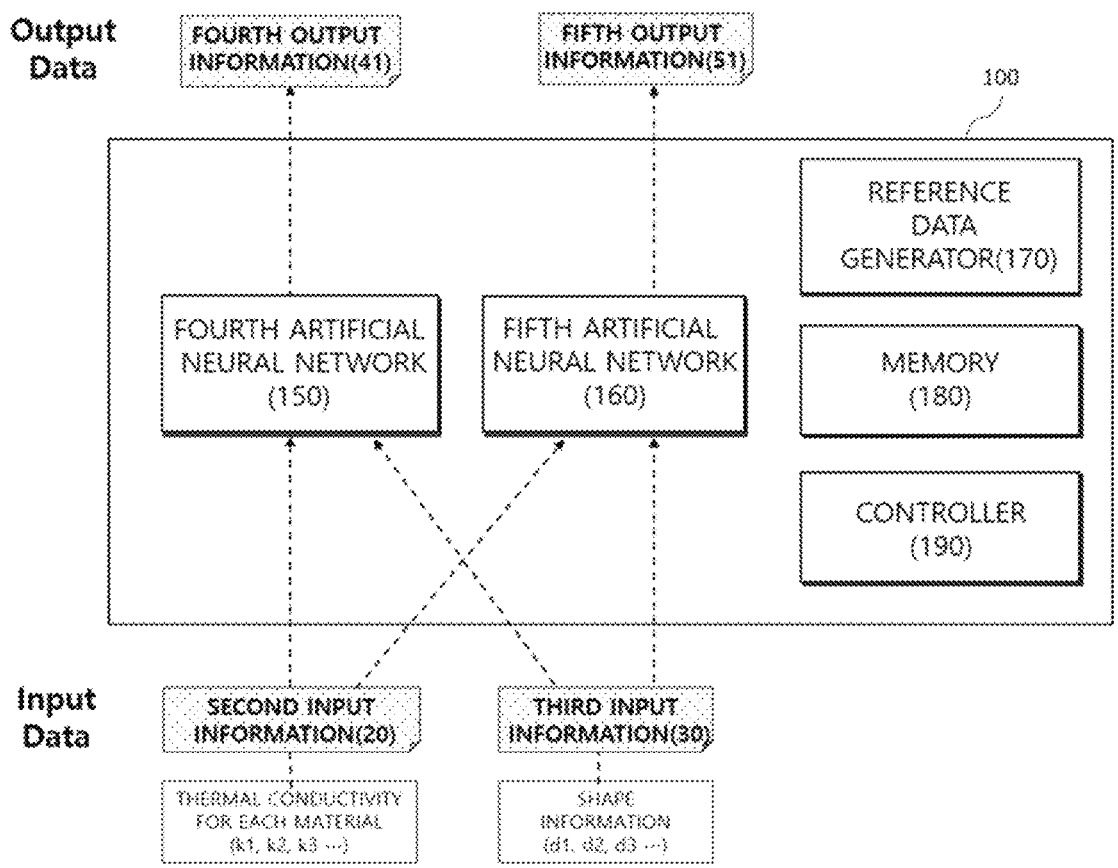
FIG. 9 is a diagram illustrating some components of a device for calculating thermal characteristics of a building structure according to another embodiment of the present disclosure.
Figure 10:
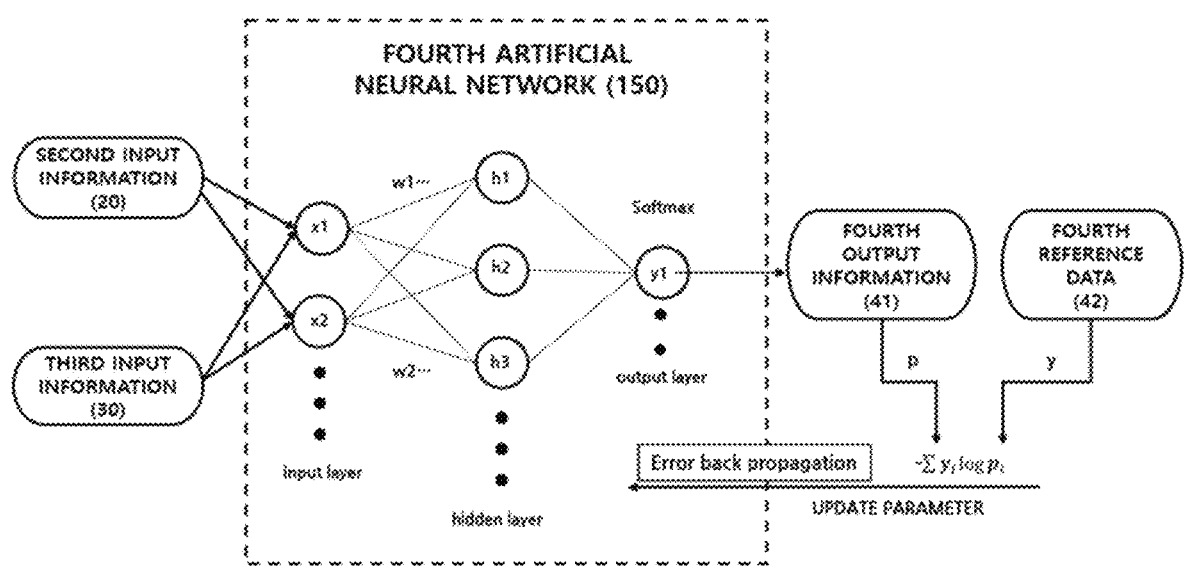
FIG. 10 is a diagram illustrating input information and output information of a fourth artificial neural network according to one embodiment of the present disclosure.
Figure 11:
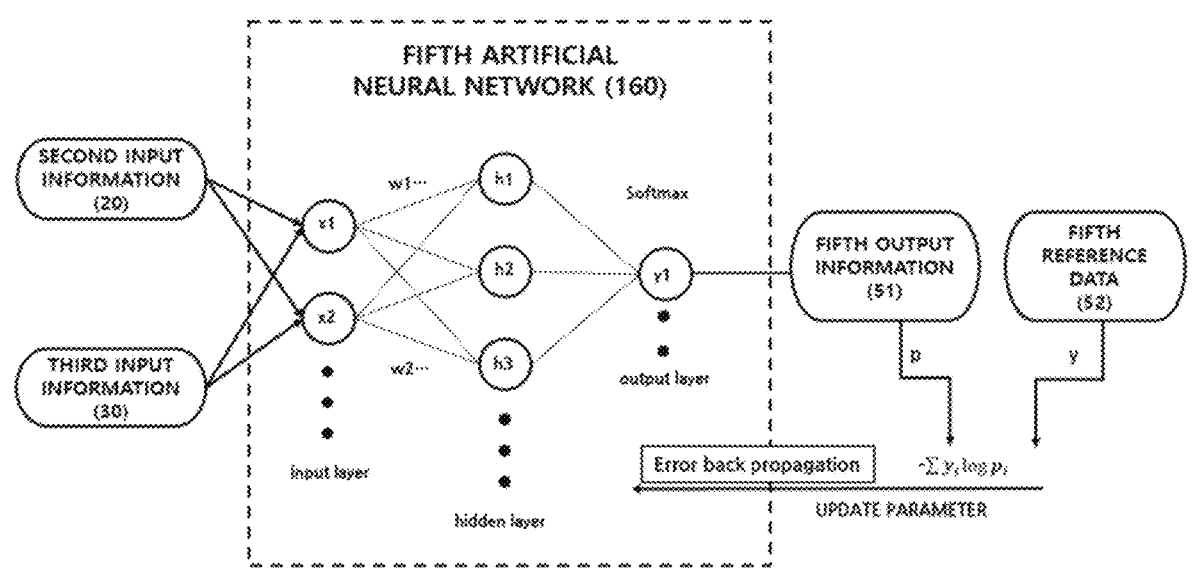
FIG. 11 is a diagram illustrating input information and output information of a fifth artificial neural network according to one embodiment of the present disclosure.

FIG. 9 is a diagram illustrating some components of a device for calculating thermal characteristics of a building structure according to another embodiment of the present disclosure. FIG. 10 is a diagram illustrating input information and output information of a fourth artificial neural network according to one embodiment of the present disclosure. FIG. 11 is a diagram illustrating input information and output information of a fifth artificial neural network according to one embodiment of the present disclosure.

Referring to FIG. 9, a device 100 for calculating thermal characteristics of a building structure according to another embodiment may include a fourth artificial neural network 150, a fifth artificial neural network 160, a reference data generator 170, a memory 180, a controller 190, and the like. Meanwhile, since the reference data generator 170, the memory 180, and the controller 190 shown in FIG. 9 are the same as those described with reference to FIG. 2, descriptions thereof will be omitted, and the fourth artificial neural network 150 and the fifth artificial neural network 160 will be described.

As shown in FIG. 10, the fourth artificial neural network 150 is a pre-trained artificial neural network receiving second input information 20 as third input information 30 as input information and outputting fourth output information 41 as output information. Although not shown in the drawing, the fourth artificial neural network 150 may include a learning session for performing learning based on the second input information 20, third input information 30, the fourth output information 41, and fourth reference data 42, and an inferring session for inferring the fourth output information 41 based on the second input information 20 and the third input information 30. Meanwhile, since the second input information 20 has been described above, descriptions thereof will be omitted.

The third input information 30 may be shape information about each part of a drawing image included in first input information 10, and the shape information may include information about a numerical value or a model of each part.

The fourth output information 41 may include heat loss information about the entire drawing image included in the first input information 10. Since the heat loss information is digitized information, unlike second output information 21 and third output information 31, the fourth output information 41 is not imaged information.

The fourth reference data 43 refers to ground truth information which is generated by the reference data generator 170 and is used to train the fourth artificial neural network 150.

As described above, the fourth reference data 43 generated by the reference data generator 170 is information generated through a finite element method and refers to reference information about heat loss information corresponding to the drawing image included in the first input information 10.

As shown in FIG. 11, the fifth artificial neural network 160 is a pre-trained artificial neural network receiving the second input information 20 and the third input information 30 as input information and outputting fifth output information 51 as output information. Although not shown in the drawing, the fifth artificial neural network 160 may include a learning session for performing learning based on the second input information 20, the third input information 30, the fifth output information 51, and fifth reference data 52, and an inferring session for inferring the fifth output information 51 based on the second input information 20 and the third input information 30. Meanwhile, since the second input information 20 and the third input information 30 have been described above, descriptions thereof will be omitted.

The fifth output information 51 may include linear thermal transmittance information about the entire drawing image included in the first input information 10. Since the linear thermal transmittance information is digitized information, unlike the second output information 21 and the third output information 31, the fifth output information 51 is not imaged information.

The fifth reference data 53 refers to ground truth information which is generated by the reference data generator 170 and is used to train the fifth artificial neural network 160.

As described above, the fifth reference data 53 generated by the reference data generator 170 is information generated through a finite element method and refers to reference information about heat loss information corresponding to the drawing image included in the first input information 10.

The fourth artificial neural network 150 and the fifth artificial neural network 160 may be implemented using a multi-layer perceptron which is a deep learning algorithm including multi-layer perception (MLP) including a plurality of layers, and as specific layers constituting the artificial neural network, known layers may be used.

So far, a method and a device for calculating thermal characteristics of a building structure using an artificial neural network according to one embodiment have been described in detail through the drawings.

In a method and a device for calculating thermal characteristics of a building structure using an artificial neural network according to one embodiment, thermal information of a structure according to various shapes of a building structure and a thermal property of a material is generated through a finite element analysis, and deep learning is performed based on data generated in such a manner, thereby very quickly deriving information about thermal characteristic values such as heat loss and linear thermal transmittance of the building structure and thermal characteristic images such as a temperature distribution image and a heat flow distribution image of the building structure.

In addition, in a method and a device for calculating thermal characteristics of a building structure using an artificial neural network according to one embodiment, since a deep learning algorithm trained based on data calculated through a finite element method may be implemented in the form of software, there is no need for modeling and analysis times according to a separate finite element analysis, thereby analyzing the thermal characteristics of a building structure in real time unlike a related art.

In a method and a device for calculating thermal characteristics of a building structure using an artificial neural network according to one embodiment, thermal information of a structure according to various shapes of a building structure and a thermal property of a material is generated through a finite element analysis, and deep learning is performed based on data generated in such a manner, thereby very quickly deriving information about thermal characteristic values such as heat loss and linear thermal transmittance of the building structure and thermal characteristic images such as a temperature distribution image and a heat flow distribution image of the building structure.

In addition, in a method and a device for calculating thermal characteristics of a building structure using an artificial neural network according to one embodiment, since a deep learning algorithm trained based on data calculated through a finite element method may be implemented in the form of software, there is no need for modeling and analysis times according to a separate finite element analysis, thereby analyzing the thermal characteristics of a building structure in real time unlike a related art.

Effects of the present disclosure are not limited to those described above, and other effects which have not been described above will be clearly understood by those skilled in the art from the following descriptions.

The above-described device may be implemented as a hardware component, a software component, and/or a combination of a hardware component and a software component. For example, the device and components described in the embodiments may be implemented using one or more general-purpose computers or special-purpose computers such as, for example, a processor, a controller, an arithmetic logic unit (ALU), a digital signal processor, a microcomputer, a field programmable array (FPA), a programmable logic unit (PLU), a microprocessor, or other devices implementing instructions and responding thereto. The processor may execute one or software applications that run on an operating system (OS). In addition, the processor may approach data, store, manipulate, and process the data, and generate new data in response to the running of software. Although one processor has been used to aid in understanding, those skilled in the art can understand that the processor may include a plurality of processing elements and/or a plurality of processing element types. For example, the processor may include a plurality of processors or one processor and one controller. Further, another processing configuration, such as a parallel processor, may be applied.

Software may include a computer program, a piece of code, an instruction, or one or more combinations thereof, to independently or collectively instruct or constitute a processing device to operate as desired. Software and/or information may be embodied permanently or temporarily in any type of machine, component, physical or virtual equipment, computer storage medium or device so as to be interpreted by a processing device or to provide a command or date to the processing device. Software may be distributed over a networked computer system, and stored or executed in a distributed manner. Software and information may be stored in one or more computer-readable recording media.

Methods according to embodiments may be implemented in the form of program instructions executable through diverse computing means and may be recorded in computer-readable media Computer-readable recording media may include magnetic media such as hard disks, floppy disks, and magnetic tapes, optical media such as a compact disc read only memory (CD-ROM) and a digital versatile disc (DVD), magneto-optical media such as floptical disks, and hardware units, such as a read only memory (ROM), a random access memory (RAM), a flash memory, and so on, which are intentionally formed to store and perform program instructions. Program instructions may include high-class language codes executable by computers using interpreters, as well as machine language codes such as those made by compilers.

While embodiments of the present disclosure have been shown and described with reference to the accompanying drawings thereof, it will be understood by those skilled in the art that various changes and modifications in form and details may be made therein. For example, desired results may be achieved although the embodiments of the present disclosure are performed in other sequences different from the descriptions, and/or the elements, such as a system, a structure, a device, a circuit, and so on, are combined or assembled in other ways different from the descriptions, or replaced or substituted with other elements or their equivalents. Therefore, other implementations, other embodiments, and equivalents of the appended claims may be included in the scope of the appended claims.

What is claimed is:

1. A device for calculating thermal characteristics of a building structure using an artificial neural network, the device comprising:
   a first artificial neural network which receives first input information including a drawing image as input information and outputs first output information including feature information, comprising parameterized shape and thermal property vectors for each part of the drawing image, in which shape information for each part of the drawing image is extracted, as output information;
   a second artificial neural network which receives the first output information and second input information including thermal conductivity information for each part as input information and outputs second output information including temperature distribution image information corresponding to the drawing image as output information;
   a third artificial neural network which receives the first output information and the second input information as input information and outputs third output information including heat flow distribution image information corresponding to the drawing image as output information; and
   a reference data generator which generates second reference data corresponding to the second output information for training the second artificial neural network and third reference data corresponding to the third output information for training the third artificial neural network,
   wherein the second artificial neural network and the third artificial neural network learn based on the second reference data and the third reference data, respectively,
   wherein the device comprises a connection layer configured to integrate the first output information and the second input information by concatenation into a combined latent tensor supplied commonly to the second and the third artificial neural networks,
   wherein the second output information and the third output information are generated by decoder networks including deconvolution layers as images spatially registered with the drawing image, and
   wherein the device further comprises a visualization and calculation module configured to superpose the generated images on the drawing image in a user interface of a building design system and to calculate at least one design verification parameter including total heat loss or linear thermal transmittance.

2. The device of claim 1, wherein the reference data generator generates the second reference data and the third reference data using a finite element method (FEM).

3. The device of claim 2, wherein, based on the feature information for each part of the drawing image, the reference data generator generates drawing images respectively corresponding to the second output information and the third output information as the second reference data and the third reference data through the FEM.

4. The device of claim 3, wherein the feature information for each part includes information acquired by parameterizing features of a shape and a thermal property of each part.

5. The device of claim 1, comprising the connection layer configured to integrate the first output information and the second input information into one layer.

6. The device of claim 4, wherein the connection layer is disposed between an output layer of the first artificial neural network and an input layer of the second artificial neural network and the third artificial neural network.

7. The device of claim 1 further comprising: a fourth artificial neural network which receives second input information comprising thermal conductivity values assigned to each part included in a drawing image and third input information comprising parameterized shape feature vectors of parts extracted from the drawing image by a first artificial neural network including thermal conductivity information about parts included in a drawing image and third input information including shape information about the parts as input information and outputs fourth output information including total heat loss information about the parts included in the drawing image as output information; and a fifth artificial neural network which receives the second input information and the third input information as input information and outputs fifth output information including total linear thermal transmittance information about the parts included in the drawing image as output information, wherein the device further comprises a visualization and calculation module configured to display the total heat loss information and the total linear thermal transmittance information in association with the drawing image and to output the total heat loss information and the total linear thermal transmittance information as design verification parameters usable for building design validation, the fourth and fifth artificial neural networks being trained using reference data sets generated by an automated finite element method (FEM) covering geometry and conductivity parameter ranges.

8. The device of claim 7, further comprising a reference data generator which generates fourth reference data corresponding to the fourth output information for training the fourth artificial neural network and fifth reference data corresponding to the fifth output information for training the fifth artificial neural network,
wherein the fourth artificial neural network and the fifth artificial neural network learn based on the fourth reference data and the fifth reference data, respectively.

9. The device of claim 8, wherein the reference data generator generates the fourth reference data and the fifth reference data using a finite element method (FEM).

10. The device of claim 9, wherein, based on feature information for each part of the drawing image, the reference data generator generates data values respectively corresponding to the fourth output information and the fifth output information as the fourth reference data and the fifth reference data through the FEM.

11. The device of claim 10, wherein the feature information for each part includes information acquired by parameterizing features of a shape and a thermal property of the each part.

12. A method of calculating thermal characteristics of a building structure using an artificial neural network, the method comprising:
a first output information outputting operation of outputting first output information using a first artificial neural network which receives first input information including a drawing image as input information and outputs the first output information including feature information comprising parameterized shape and thermal property vectors for each part of the drawing image, in which shape information for each part of the drawing image is extracted, as output information;
a second output information outputting operation of outputting second output information using a second artificial neural network which receives the first output information and second input information including thermal conductivity information corresponding to the drawing image as input information and outputs the second output information including temperature distribution image information corresponding to the drawing image as output information;
a third output information outputting operation of outputting third output information using a third artificial neural network which receives the first output information and the second input information including the thermal conductivity information corresponding to the drawing image as input information and outputs the third output information including heat flow distribution image information corresponding to the drawing image as output information;
a reference data generating operation of generating second reference data corresponding to the second output information for training the second artificial neural network and third reference data corresponding to the third output information for training the third artificial neural network;
a learning operation of training the second artificial neural network and the third artificial neural network based on the second reference data and the third reference data, respectively; and
a presenting operation of superposing the temperature distribution image information and the heat flow distribution image information on the drawing image in a user interface of a building design system and calculating at least one design verification parameter including total heat loss or linear thermal transmittance based on the superposed image information.

13. The method of claim 12, wherein the reference data generating operation includes, based on the feature information for each part of the drawing image, generating drawing images respectively corresponding to the second output information and the third output information as the second reference data and the third reference data through a finite element method.

* * * * *